(12) United States Patent
Chen

(10) Patent No.: US 12,372,816 B2
(45) Date of Patent: Jul. 29, 2025

(54) APPARATUS AND METHOD FOR A SILICON MODULATOR WITH STRONG GRADIENT SLAB DOPING

(71) Applicant: ACACIA TECHNOLOGY, INC., San Jose, CA (US)

(72) Inventor: Long Chen, Marlboro, NJ (US)

( * ) Notice: Subject to any disclaimer, the term of this patent is extended or adjusted under 35 U.S.C. 154(b) by 0 days.

(21) Appl. No.: 16/937,334

(22) Filed: Jul. 23, 2020

(65) Prior Publication Data
US 2022/0026747 A1   Jan. 27, 2022

(51) Int. Cl.
*G02F 1/025* (2006.01)

(52) U.S. Cl.
CPC ........ *G02F 1/025* (2013.01); *G02F 2201/063* (2013.01)

(58) Field of Classification Search
CPC ............................ G02F 1/025; G02F 2201/063
USPC .......................................................... 385/1–3
See application file for complete search history.

(56) References Cited

U.S. PATENT DOCUMENTS

| | | |
|---|---|---|
| 7,085,443 B1 | 8/2006 | Gunn, III et al. |
| 7,672,553 B2 | 3/2010 | Gill et al. |
| 7,865,053 B2 | 1/2011 | Gill |
| 8,362,494 B2 | 1/2013 | Lo et al. |
| 8,380,016 B1 | 2/2013 | Hochberg et al. |
| 9,372,381 B2 | 6/2016 | Vermeulen et al. |
| 9,405,073 B2 | 8/2016 | Chen et al. |
| 9,477,039 B2 | 10/2016 | Doerr et al. |
| 9,494,748 B2 | 11/2016 | Chen et al. |
| 9,625,746 B2 | 4/2017 | Chen et al. |
| 9,671,559 B2 | 6/2017 | Chen et al. |
| 9,703,038 B1 | 7/2017 | Chen |
| 9,726,840 B2 | 8/2017 | Chen |
| 9,766,410 B1 | 9/2017 | Chen |
| 9,829,659 B2 | 11/2017 | Chen et al. |
| 9,922,887 B2 | 3/2018 | Vermeulen et al. |
| 9,939,666 B2 | 4/2018 | Chen |

(Continued)

OTHER PUBLICATIONS

"Concentration Profiles of Diffused Dopants in Silicon" by Fair, Impurity Doping edited by F. F. Y. Wang, North-Holland Publishing Company (Year: 1981).*

(Continued)

*Primary Examiner* — Robert Tavlykaev
(74) *Attorney, Agent, or Firm* — Patterson + Sheridan, LLP

(57) ABSTRACT

Methods of fabricating electro-optical modulators and the resulting electro-optical modulators are described herein. In some embodiments, a method comprises defining a waveguide having a core region, implanting dopants into a contact region of the waveguide, and diffusing the dopants laterally toward the core region. In some embodiments, a method comprises implanting n-type and p-type dopants into respective first and second contact regions of the optical waveguide and annealing the optical waveguide to induce lateral diffusion of the n-type and p-type dopants toward a center of the optical waveguide. In some embodiments, an electro-optical modulator comprises a waveguide comprising a contact region and a core region, and the waveguide has a dopant concentration that decreases from the contact region to the core region according to a super-linear curve. Methods and resulting structures described herein provide desirable electrical resistance and low overlap between dopants and optical signals.

17 Claims, 10 Drawing Sheets

(56) References Cited

U.S. PATENT DOCUMENTS

| | | | |
|---|---|---|---|
| 9,977,269 | B2 | 5/2018 | Chen |
| 9,989,787 | B2 | 6/2018 | Chen et al. |
| 10,031,292 | B2 | 7/2018 | Chen |
| 10,088,733 | B2 | 10/2018 | Doerr et al. |
| 10,133,142 | B2 | 11/2018 | Doerr et al. |
| 10,203,453 | B2 | 2/2019 | Chen |
| 10,222,566 | B1 | 3/2019 | Doerr et al. |
| 10,241,268 | B2 | 3/2019 | Chen et al. |
| 10,284,300 | B2 | 5/2019 | Doerr et al. |
| 10,295,750 | B2 | 5/2019 | Chen |
| 10,416,380 | B1 | 9/2019 | Chen et al. |
| 10,866,440 | B1 * | 12/2020 | Cho ................. G02F 1/025 |
| 2008/0159680 | A1 * | 7/2008 | Gill ................. G02F 1/3133 385/3 |
| 2011/0180795 | A1 | 7/2011 | Lo et al. |
| 2011/0194803 | A1 | 8/2011 | Shin et al. |
| 2012/0063714 | A1 | 3/2012 | Park et al. |
| 2012/0189239 | A1 | 7/2012 | Tu et al. |
| 2012/0257850 | A1 | 10/2012 | Fujikata et al. |
| 2015/0198859 | A1 | 7/2015 | Chen |
| 2015/0212271 | A1 | 7/2015 | Chen |
| 2015/0212345 | A1 | 7/2015 | Chen et al. |
| 2015/0293384 | A1 | 10/2015 | Ogawa et al. |
| 2016/0202503 | A1 | 7/2016 | Chen |
| 2017/0059958 | A1 | 3/2017 | Doerr et al. |
| 2017/0139305 | A1 | 5/2017 | Chen |
| 2017/0248806 | A1 | 8/2017 | Chen et al. |
| 2017/0336658 | A1 | 11/2017 | Chen |
| 2018/0003899 | A1 | 1/2018 | Doerr et al. |
| 2018/0041282 | A1 | 2/2018 | Chen et al. |
| 2020/0124883 | A1 | 4/2020 | Delisle-Simard et al. |

OTHER PUBLICATIONS

Ding et al., Design and characterization of a 30-GHz bandwidth low-power silicon traveling- wave modulator. Optics Communications. 2014;321:124-133.

Yu et al., Optimization of Ion Implantation Condition for Depletion-Type Silicon Optical Modulators. IEEE J Quantum Elec. Dec. 2010;46(12): 1763-8.

International Search Report and Written Opinion of the International Search Authority for International Application No. PCT/US2021/042571 mailed from the U.S. International Searching Authority on Nov. 9, 2021 (14 pages).

* cited by examiner

APPARATUS AND METHOD FOR A SILICON MODULATOR WITH STRONG GRADIENT SLAB DOPING

BACKGROUND

Field

Aspects of the present application relate to silicon modulators.

Related Art

Silicon modulators include a silicon waveguide that carries an optical signal, and electrodes that allow for application of an electrical signal to modulate the optical signal. The silicon waveguide sometimes has a rib-shaped core region in which the optical signal is largely confined. Typically, one side of the silicon waveguide is doped p-type and the other side is doped n-type. Contact regions for contacting the electrodes are included at the respective sides, with greater concentrations of p-type and n-type doping in the contact regions than in other portions of the silicon waveguide.

BRIEF SUMMARY

A method of forming an electro-optical modulator is provided, the method comprising defining a waveguide having a core region, implanting dopants into a contact region of the waveguide, and diffusing the dopants laterally toward the core region.

A method of forming a doped optical waveguide is provided, the method comprising implanting n-type and p-type dopants into respective first and second contact regions of the optical waveguide and annealing the optical waveguide to induce lateral diffusion of the n-type and p-type dopants toward a center of the optical waveguide.

An electro-optical modulator is provided, the electro-optical modulator comprising a waveguide comprising a contact region and a core region, wherein the waveguide has a dopant concentration that decreases from the contact region to the core region according to a super-linear curve.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
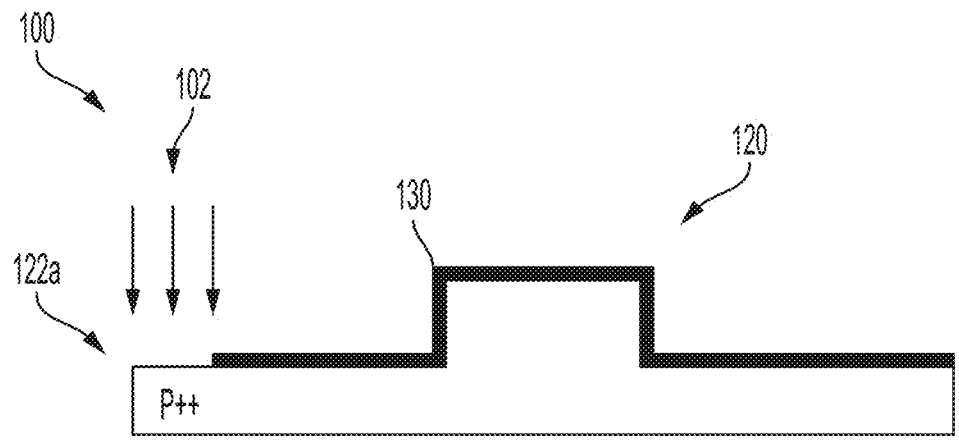
FIG. 1A is a cross-sectional view of a waveguide having p-type dopants implanted into a first contact region, according to a non-limiting embodiment of the present application.

Some aspects of the present application provide a method of forming an electro-optical modulator. In some embodiments, the method comprises defining a waveguide (e.g., a rib waveguide) having a core region and contact region, implanting dopants into the contact region of the waveguide, and diffusing the dopants laterally from the contact region toward the core region. In some embodiments, diffusing the dopants laterally toward the core region creates a doping profile of the waveguide that accommodates the shape of the power distribution of an optical signal carried by the waveguide. In some embodiments, diffusing the dopants laterally toward the core region creates a doping profile with beneficial characteristics. In some embodiments, the strength of the optical signal in the waveguide decreases from the core region to the contact region. Diffusing the dopants laterally toward the core region may create a doping profile that exhibits a small amount of overlap between the optical signal and the dopants. This small amount of overlap may result in a small amount of undesirable loss of the optical signal due to absorption by the dopants. In some embodiments, diffusing the dopants laterally toward the core region creates a doping profile that provides low electrical resistance by allowing for a high concentration of dopants in the waveguide to increase conductivity of the slab. In some embodiments, diffusing the dopants laterally toward the core region creates a doping profile that provides both beneficial electrical resistance characteristics and low overlap between the optical signal and the dopants in the waveguide.

Some aspects of the present application provide a method of forming a doped optical waveguide. In some embodiments, the method comprises implanting n-type and p-type dopants into respective first and second contact regions of a slab of the optical waveguide and annealing the slab to induce lateral diffusion of the n-type and p-type dopants toward a core region of the slab. The core region may be located at or near a center of the waveguide, between two contact regions of the waveguide. The core region may be centrally located between two contact regions of the waveguide. In some embodiments, annealing the slab to induce lateral diffusion of the n-type and p-type dopants toward the core region of the slab creates a doping profile of the slab to account for the shape of the power distribution of an optical signal carried by the slab. In some embodiments, annealing the slab to induce lateral diffusion of the n-type and p-type dopants creates a doping profile with beneficial characteristics. In some embodiments, the strength of the optical signal in the waveguide decreases from the core region to the contact region. Annealing the slab to induce lateral diffusion of the n-type and p-type dopants toward the center of the waveguide may create a doping profile that exhibits a small amount of overlap between the optical signal and the dopants. This small amount of overlap may result in a small amount of undesirable loss of the optical signal due to absorption by the dopants. In some embodiments, annealing the slab to induce lateral diffusion of the n-type and p-type dopants creates a doping profile that provides low electrical resistance by allowing for a high concentration of dopants in the waveguide to increase conductivity of the waveguide. In some embodiments, annealing the slab to induce lateral diffusion of the n-type and p-type dopants creates a doping profile that provides both beneficial electrical resistance characteristics and low overlap between the optical signal and the dopants in the slab.

Some aspects of the present application provide an electro-optical modulator. In some embodiments, the electro-optical modulator comprises a waveguide (e.g., a rib waveguide) comprising a core region and a contact region, and the waveguide has a dopant concentration that decreases from the contact region to the core region according to a super-linear curve. In some embodiments, a waveguide having a dopant concentration that decreases from the contact region to the core region according to a super-linear curve accounts for the shape of the power distribution of an optical signal carried by the waveguide. In some embodiments, a waveguide having a dopant concentration that decreases from the contact region to the core region according to a super-linear curve may have a doping profile with beneficial characteristics. In some embodiments, the strength of the optical signal in the waveguide decreases from core region to the contact region. A waveguide having a dopant concentration that decreases from the contact region to the core region according to a super-linear curve may exhibit a small amount of overlap between the optical signal and the dopants. This small amount of overlap may result in a small amount of undesirable loss of the optical signal due to absorption by the dopants. In some embodiments, a waveguide having a dopant concentration that decreases from the contact region to the core region according to a super-linear curve may have a doping profile that provides low electrical resistance by allowing for a high concentration of dopants in the waveguide to increase conductivity of the waveguide. In some embodiments, a waveguide having a dopant concentration that decreases from the contact region to the core region according to a super-linear curve may have a doping profile that provides both beneficial electrical resistance characteristics and low overlap between the optical signal and the dopants in the waveguide.

The aspects and embodiments described above, as well as additional aspects and embodiments, are described further below. These aspects and/or embodiments may be used individually, all together, or in any combination of two or more, as the application is not limited in this respect.

FIGS. 1A-1G are cross-sectional views of a waveguide 120 of an electro-optical modulator 100 illustrating various steps for forming the waveguide 120, according to a non-limiting embodiment of the present application.

FIG. 1A is a cross-sectional view of the waveguide 120 having p-type dopants 102 implanted into a first contact region 122a, according to a non-limiting embodiment of the present application. In some embodiments, the waveguide 120 may be formed using one or more semiconductor materials. For example, in some embodiments the waveguide 120 is formed of silicon, germanium, and/or gallium arsenide, among other possible materials.

In some embodiments, the waveguide 120 may be undoped or lightly p-type and/or n-type doped prior to implanting the p-type dopants 102 into the first contact region 122a. As shown in FIG. 1A, a mask 130 is disposed over the waveguide 120 to prevent the p-type dopants 102 from being implanted in regions other than the first contact region 122a. In some embodiments, the first contact region 122a may be doped with a p-type dopant concentration high enough to provide a low contact resistance when an electrode (shown subsequently in FIG. 1G) is in contact with the first contact region 122a. In some embodiments, the first contact region 122a may be implanted with a P++ doping level. In some embodiments, the first contact region 122a may have on the order of $10^{20}$ dopants/cm$^3$, although other concentrations are possible.

Figure 1B:
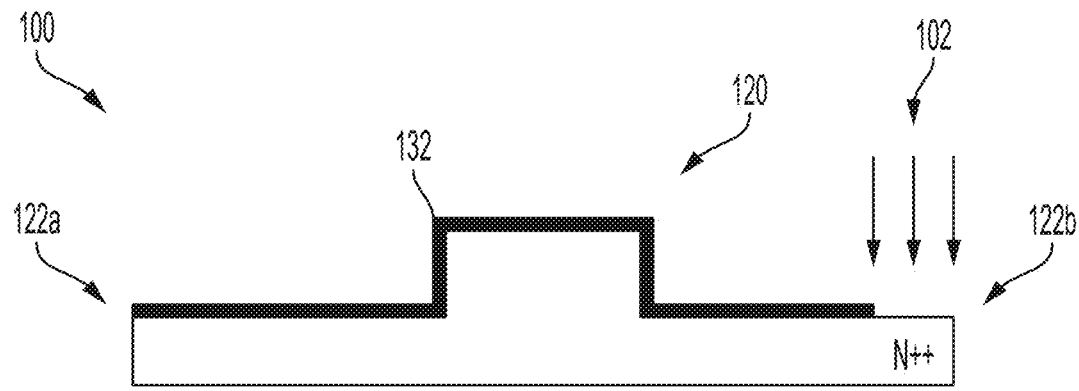
FIG. 1B is a cross-sectional view of the waveguide of FIG. 1A having n-type dopants implanted into a second contact region, according to a non-limiting embodiment of the present application.

FIG. 1B is a cross-sectional view of the waveguide 120 having n-type dopants 104 implanted into a second contact region 122b, according to a non-limiting embodiment of the present application. In some embodiments, the waveguide 120 may be undoped or lightly p-type and/or n-type doped prior to implanting the n-type dopants 104 into the second contact region 122b. In some embodiments, the n-type dopants 104 may be implanted into the second contact region 122b after the p-type dopants 102 have been implanted into the first contact region 122a. In some embodiments, the n-type dopants 104 may be implanted into the second contact region 122b before the p-type dopants 102 have been implanted into the first contact region 122a. As shown in FIG. 1B, a mask 132 is disposed over the waveguide 120 to prevent the n-type dopants 104 from being implanted in regions other than the second contact region 122b. In some embodiments, the second contact region 122b may be doped with a p-type dopant concentration high enough to provide a low contact resistance when an electrode (shown subsequently in FIG. 1G) is in contact with the second contact region 122b. In some embodiments, the second contact region 122b may be implanted with an N++ doping level. In some embodiments, the second contact region 122b may have on the order of $10^{20}$ dopants/cm$^3$, although other concentrations are possible.

Figure 1C:
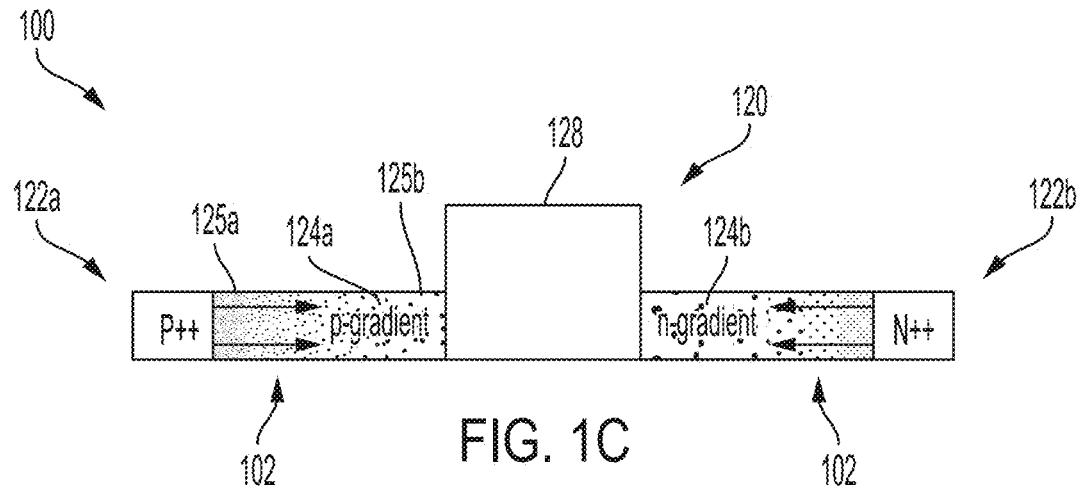
FIG. 1C is a cross-sectional view of the waveguide of FIGS. 1A-1B as the p-type dopants and the n-type dopants are diffused laterally from the respective first and second contact regions toward a core region of the waveguide, according to a non-limiting embodiment of the present application.

FIG. 1C is a cross-sectional view of the waveguide 120 as the p-type dopants 102 and the n-type dopants 104 are diffused laterally from the respective first and second contact regions 122a and 122b toward a core region 128 of the waveguide 120. The core region 128 is positioned at the center of the waveguide. As shown in FIG. 1C, slab regions of the waveguide into which the p-type dopants and the n-type dopants 104 are diffused connect the core region 128 to the first and second contact regions 122a and 122b. In the non-limiting example shown, the core region 128 is a rib, such that the waveguide 120 may be referred to as a rib waveguide.

In some embodiments, the p-type dopants 102 and the n-type dopants 104 may be diffused by annealing the waveguide 120. In some embodiments, the p-type dopants 102 and the n-type dopants 104 may be diffused by annealing the waveguide 120 for a period of time between 1 minute and 10 hours at a temperature between 8000 degrees and 1200 degrees Celsius, including any duration within the listed duration and any temperature within the listed temperature range. In some embodiments, the p-type dopants 102 and the n-type dopants 104 may be diffused by annealing the waveguide 120 for about 30 minutes at a temperature of 1030 degrees Celsius. In some embodiments, annealing the waveguide 120 may diffuse the p-type dopants 102 and the n-type dopants 104 by more than 0.1 micron in the lateral direction toward the core region 128. In some embodiments, the p-type dopants 102 and n-type dopants 104 may be diffused by annealing the waveguide 120 at a temperature and duration sufficient to cause some p-type dopants and some n-type dopants to reach close proximity to an edge of the core region 128. In some embodiments, annealing the waveguide 120 may diffuse the p-type dopants 102 and the n-type dopants 104 resulting in a dopant concentration of the p-type dopants 102 and the n-type dopants 104 that is greater than $5\times10^{17}$ dopants/cm$^3$ within 300 nm of the respective edges of the core region 128. In some embodiments, annealing the waveguide 120 may diffuse the p-type dopants 102 and the n-type dopants 104 resulting in a dopant concentration of the p-type dopants 102 and the n-type dopants 104 that is greater than $5\times10^{17}$ dopants/cm$^3$ within the core region 128. That is, in some embodiments, the p-type and n-type dopants are diffused laterally within the slab such that the dopants reach the core region, resulting in a dopant concentration within the core region of at least $5\times10^{17}$ dopants/cm$^3$. In some embodiments, the p-type dopants and the n-type dopants are diffused laterally within the slab such that the dopants reach 50 nm into the core region, 100 nm into the core region, or 200 nm into the core region, or any distance therebetween into the core region, resulting in a dopant concentration of at least $5\times10^{17}$ dopants/cm$^3$ 50 nm, 100 nm, or 200 nm, or any distance in between, into the core region. In at least some embodiments, the p-type dopants 102 and the n-type dopants 104 may be diffused simultaneously. In some embodiments, the p-type dopants 102 and the n-type dopants 104 may be diffused in a same annealing step.

As shown in FIG. 1C, the waveguide 120 has a doping profile 124a with decreasing dopant concentration from the first contact region 122a toward the core region 128 and a doping profile 124b with decreasing dopant concentration from the second contact region 122b toward the core region 128. The gradient at which the first and second doping profiles 124a and 124b decrease is represented by the stippling pattern illustrated in the waveguide 120 between the first and second contact regions 122a and 122b and the core region 128. As indicated by the stippling pattern in FIG. 1C, a first portion 125a of the waveguide 120 positioned closer to the first contact region 122a than to the core region 128 has a greater dopant concentration than a second portion 125b of the waveguide 120 positioned closer to the core region 128 than to the first contact region 122a. In some embodiments, the dopant concentration of the waveguide 102 decreases continuously from the first contact region 122a to the core region 128, and from the second contact region 122b to the core region 128. The doping profile 124a and/or the doping profile 124b result from diffusing the p-type dopants 102 and the n-type dopants 104 from the respective first and second contact regions 122a and 122b toward the core region 128. In some embodiments, one or both of the doping profiles 124a and 124b may be a super-linear curve. In some embodiments, one or both of the doping profiles 124a and 124b may be an exponential curve. In some embodiments, one or both of the doping profiles 124a and 124b may be a super-linear curve or an exponential curve that drops by at least 5% per 0.05 microns in the lateral direction within the waveguide 120 in which the core region 128 is spaced from the first contact region 122a. In some embodiments, one or both of the doping profiles 124a and 124b may be a super-linear curve or an exponential curve that drops by at least 10% per 0.05 microns in the lateral direction within the waveguide 120. In some embodiments, one or both of the doping profiles 124a and 124b may have a plurality of rates of change of a dopant concentration of the respective p-type dopants and n-type dopants that vary continuously across the waveguide 120 in the lateral direction.

It should be appreciated that, in some embodiments, the first contact region 122a and the second contact region 122b may be part of a slab of the waveguide 120 that includes the core region 128. In some embodiments, the first contact region 122a, the second contact region 122b, and the core region 128 may have a same height. In some embodiments, the first contact region 122a and the second contact region 122b may each have multiple sub-regions having different heights. In some embodiments, the first contact region 122a and the second contact region 122b may each have a first sub-region having a same height as the core region 128 and a second sub-region having a greater height than the core region 128.

Figure 1D:
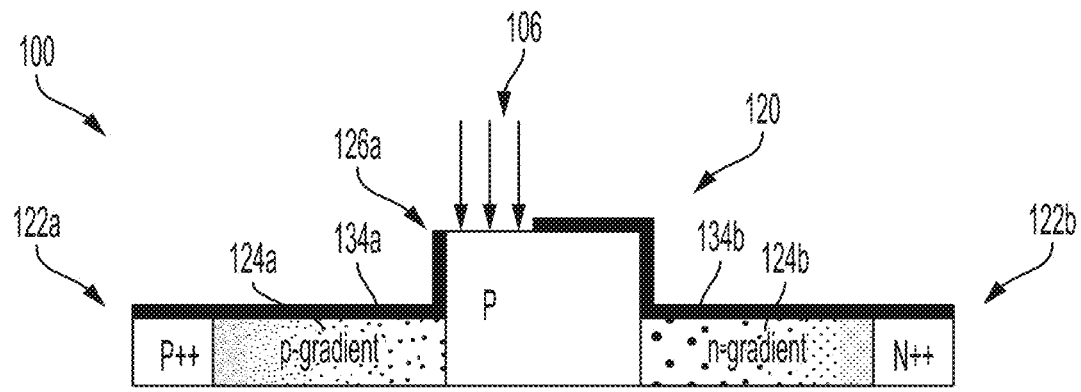
FIG. 1D is a cross-sectional view of the waveguide of FIGS. 1A-1C having p-type dopants implanted into a first portion of the core region, according to a non-limiting embodiment of the present application.

FIG. 1D is a cross-sectional view of the waveguide 120 having p-type dopants 106 implanted into a first portion 126a of the core region 128, according to a non-limiting embodiment of the present application. In some embodiments, the first portion 126a may be undoped or lightly p-type and/or n-type doped prior to implanting the p-type dopants 106. As shown in FIG. 1D, a mask comprising mask portions 134a and 134b is disposed over the waveguide 120 to prevent the p-type dopants 106 from being implanted in regions other than the first portion 126a of the core region 128. In some embodiments, the first portion 126a of the core region may be doped with a p-type dopant concentration low enough to provide low optical loss (e.g., due to carrier absorption) when the waveguide 120 carries an optical signal (not shown). For example, in some embodiments, the first portion 126a of the core region 128 is doped with a concentration between $10^{17}$-$10^{18}$ dopants/cm³. In some embodiments, the p-type dopants 106 may be implanted in the entire first portion 126a of the core region 128. In some embodiments, n-type dopants may be implanted in part of the first portion 126a of the core region 128 to offset some of the implanted p-type dopants 106. In some embodiments, the p-type dopants 106 may be implanted in only a part of the first portion 126a of the core region 128. In some embodiments, the p-type dopants 106 may be additionally implanted in a portion of the waveguide 120 disposed adjacent to the first portion 126a of the core region 128. In some embodiments, the p-type dopants 106 may be implanted at a location overlapping the location of the p-type dopants 102 diffused from the first contact region 122a. For example, the p-type dopants 102 diffused from the first contact region 122a may diffuse laterally by 0.9 microns, and the p-type dopants 106 may be implanted 0.8 microns from the first contact region 122a, meaning that the implanted p-type dopants 106 are located at a position to which the p-type dopants 102 from the first contact region 122a have diffused. In some embodiments, the p-type dopants 106 may be implanted at a location that does not overlap with the p-type dopants 102 diffused from the first contact region 122a. For example, the p-type dopants 102 diffused from the first contact region 122a may diffuse laterally by 0.9 microns, and the p-type dopants 106 may be implanted 0.9 microns from the first contact region 122a, not overlapping the point to which the p-type dopants 102 from the first contact region 122a have diffused. In some embodiments, multiple masking and implantation steps may be employed while implanting the p-type dopants 106.

Figure 1E:
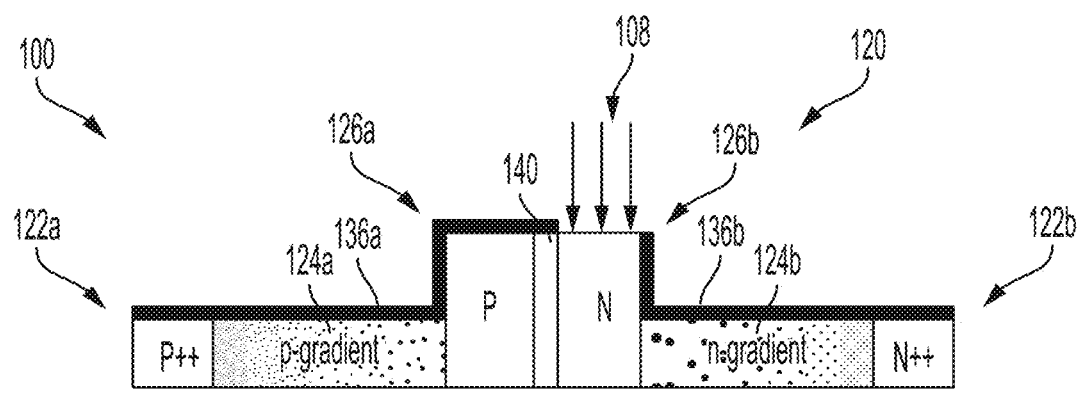
FIG. 1E is a side view of the waveguide of FIGS. 1A-1D having n-type dopants implanted into a second portion of the core region, according to a non-limiting embodiment of the present application.

FIG. 1E is a cross-sectional view of the waveguide 120 having n-type dopants 108 implanted into a second portion 126b of the core region 128, according to a non-limiting embodiment of the present application. In some embodiments, the second portion 126b may be undoped or lightly p-type and/or n-type doped prior to implanting the n-type dopants 108. As shown in FIG. 1E, a mask comprising mask portions 136a and 136b is disposed over the waveguide 120 to prevent the n-type dopants 108 from being implanted in regions other than the second portion 126b of the core region 128. In some embodiments, the second portion 126b of the core region may be doped with a n-type dopant concentration low enough to provide low optical loss (e.g., due to carrier absorption) when the waveguide 120 carries an optical signal (not shown). For example, in some embodiments, the second portion 126b of the core region 128 is doped with a concentration between $10^{17}$-$10^{18}$ dopants/cm³. In some embodiments, the n-type dopants 108 may be implanted in the entire second portion 126b of the core region 128. In some embodiments, p-type dopants may be implanted in part of the second portion 126b of the core region 128 to offset some of the implanted n-type dopants 108. In some embodiments, the n-type dopants 108 may be implanted in only a part of the second portion 126b of the core region 128. In some embodiments, the n-type dopants 108 may be additionally implanted in a portion of the waveguide 120 disposed adjacent to the second portion 126b of the core region 128. In some embodiments, the n-type dopants 108 may be implanted at a location overlapping the location of the n-type dopants 104 diffused from the second contact region 122b. For example, the n-type dopants 104 diffused from the second contact region 122b may diffuse laterally by 0.9 microns, and the n-type dopants 108 may be implanted 0.8 microns from the second contact region 122b, meaning that the implanted n-type dopants 108 is are located at a position to which then-type dopants 104 from the second contact region 122b have diffused. In some embodiments, the n-type dopants 108 may be implanted at a location that does not overlap with then-type dopants 104 diffused from the second contact region 122b. For example, the n-type dopants 104 diffused from the second contact region 122b may diffuse laterally by 0.9 microns, and the n-type dopants 108 may be implanted 0.9 microns from the second contact region 122b, not overlapping the point to which the n-type dopants 104 from the second contact region 122b have diffused. In some embodiments, multiple masking and implantation steps may be employed while implanting the n-type dopants 108.

Also shown in FIG. 1E, when the first and second portions 126a and 126b of the core region 128 have been implanted with the respective p-type dopants 106 and n-type dopants 108, a depletion region 140 is formed at the center of the waveguide 120. The depletion region 140 may substantially lack charge carriers when a sufficiently high bias voltage is applied between the first contact region 122a and the second contact region 122b and/or between the first portion 126a and the second portion 126b of the core region 128.

Figure 1F:
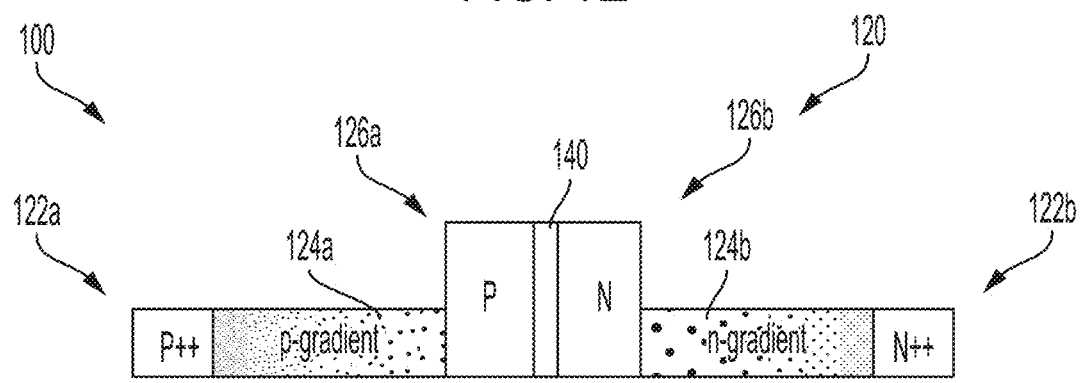
FIG. 1F is a cross-sectional view of the waveguide of FIGS. 1A-1E with a first doping profile connecting the first contact region to the first portion of the core region and a second doping profile connecting the second contact region to the second portion of the core region, according to a non-limiting embodiment of the present application.

FIG. 1F is a cross-sectional view of the waveguide 120 including the first and second contact regions 122a and 122b and the first and second portions 126a and 126b of the core region 128, with the first and second doping profiles 124a and 124b between the first contact region 122a and the first portion 126a of the core region 128 and the second contact region 122b and the second portion 126b of the core region 128, respectively, according to a non-limiting embodiment of the present application. In FIG. 1F, the mask portions 136a and 136b of FIG. 1E have been removed.

Figure 1G:
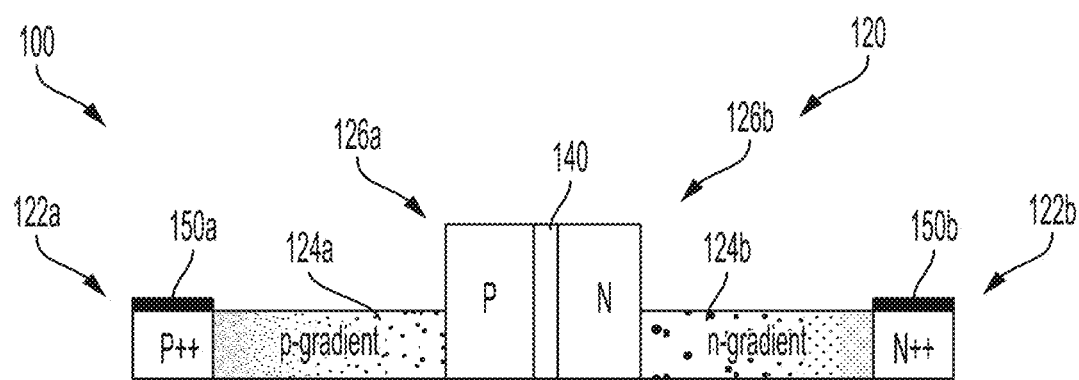
FIG. 1G is a cross-sectional view of the waveguide of FIGS. 1A-1F, further including a first electrode disposed over the first contact region and a second electrode disposed over the second contact region, according to a non-limiting embodiment of the present application.

FIG. 1G is a cross-sectional view of the waveguide 120 further including a first electrode 150a disposed over the first contact region 122a and a second electrode 150b disposed over the second contact region 122b, according to a non-limiting embodiment of the present application. The first electrode 150a and the second electrode 150b may be formed by suitable deposition and patterning of a conductive material, as an example. In some embodiments, the waveguide 120 may be configured to support an optical signal traveling along its length through the first and second portions 126a and 126b of the core region 128. An electrical signal may be applied to the electrodes 150a and 150b to modulate the optical signal.

In some embodiments, the power distribution of the optical signal supported by the waveguide 120 may follow a super-linear or exponential curve. In some embodiments, the power distribution may decrease from the first and second portions 126a and 126b of the core region 128 to the respective first and second contact regions 122a and 122b. In some embodiments, the high dopant concentration in the first and second contact regions 122a and 122b, the low dopant concentration in the first and second portions 126a and 126b, and the super-linear or exponential curve of the first and second doping profiles 124a and 124b may account for the shape of the power distribution of the optical signal by creating relatively little overlap between optical signal and the dopants disposed between the core region 128 and the contact regions 122a and 122b. In some embodiments, the super-linear or exponential curve of the first and second doping profiles 124a and 124b may exhibit a small amount of overlap between the optical signal and the dopants. This small amount of overlap may result in a small amount of undesirable loss of the optical signal due to absorption by the dopants. In some embodiments, the doping profiles 124a and 124b may provide low electrical resistance by allowing for a high concentration of dopants in the waveguide 120 to increase conductivity of the waveguide 120. In some embodiments, the doping profiles 124a and 124b may provide both beneficial electrical resistance characteristics and low overlap between the optical signal and the dopants in the waveguide 120.

Figure 2:
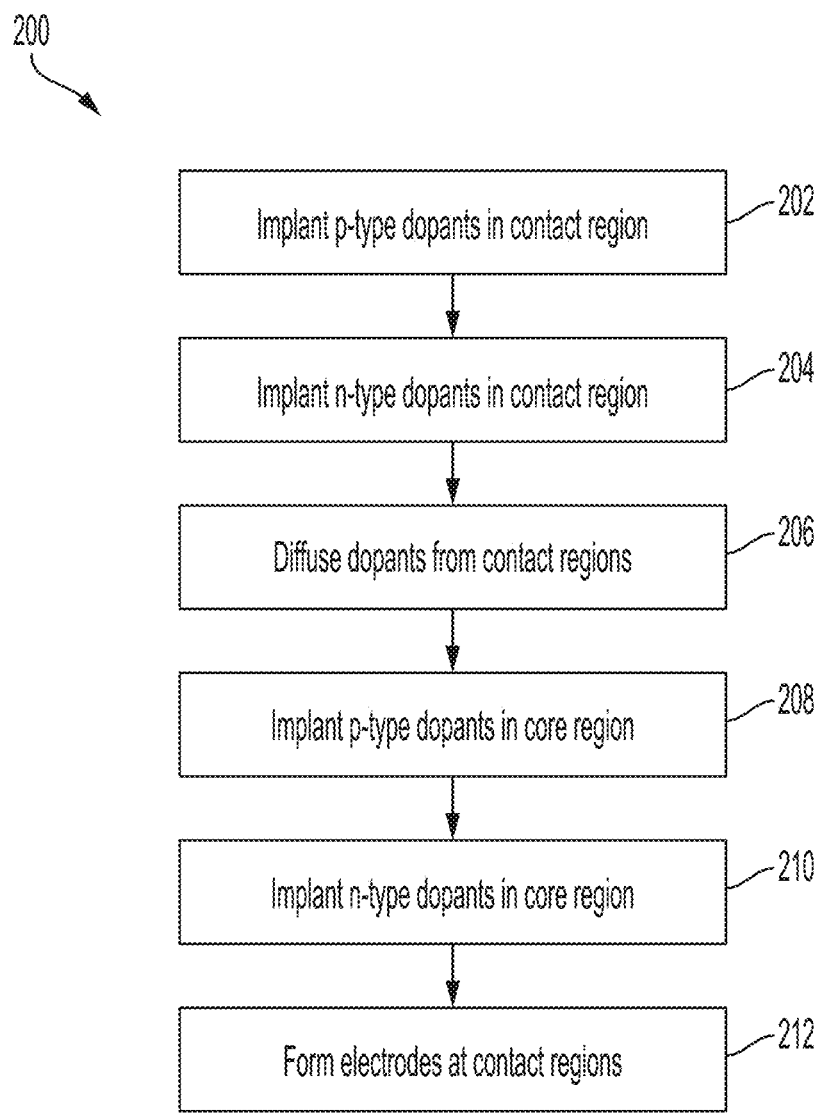
FIG. 2 is a flow diagram of a method of forming an electro-optical modulator, according to a non-limiting embodiment of the present application.

FIG. 2 is a flow diagram of a method 200 of forming an electro-optical modulator, according to a non-limiting embodiment of the present application. The method 200 is consistent with the fabrication sequence shown in FIGS. 1A-1G, and the result of the method may be an electro-optical modulator 100 as shown in FIG. 1G.

At step 202, p-type dopants are implanted into a contact region of the waveguide. In some embodiments, step 202 may be performed in the manner illustrated in and described in connection with FIG. 1A, in which the p-type dopants 102 are implanted into the first contact region 122a of the waveguide 120.

At step 204, n-type dopants are implanted into a contact region of the waveguide. In some embodiments, step 204 may be performed in the manner illustrated in and described in connection with FIG. 1B, in which the n-type dopants 104 are implanted into the second contact region 122b of the waveguide 120. It should be appreciated that step 204 may be performed before or after step 202, in accordance with various embodiments.

At step 206, the dopants are diffused from the contact regions. In some embodiments, step 206 may be performed in the manner illustrated in and described in connection with FIG. 1C, in which the p-type dopants 102 and the n-type dopants 104 are diffused from the respective first and second contact regions 122a and 122b. In some embodiments, step 206 may further comprise creating a doping profile in the waveguide, such as doping profiles 124a and 124b.

At step 208, p-type dopants are implanted into a core region of the waveguide. In some embodiments, step 208 may be performed in the manner illustrated in and described in connection with FIG. 1D, in which the p-type dopants 106 are implanted into the first portion 126a of the core region 128. For example, in some embodiments, p-type dopants may be implanted in an entire first portion of a core region. In some embodiments, n-type dopants may be implanted in part of the first portion of the core region to offset some of the implanted p-type dopants. In some embodiments, p-type dopants may be implanted in only a part of a first portion of a core region. In some embodiments, p-type dopants may be additionally implanted in a portion of a waveguide disposed adjacent to a first portion of a core region. In some embodiments, the p-type dopants may be implanted at a location overlapping the location of p-type dopants diffused from a first contact region. For example, the p-type dopants diffused from the first contact region may diffuse laterally by 0.9 microns, and the p-type dopants may be implanted 0.8 microns from the first contact region, meaning that the implanted p-type dopants are located at a position to which the p-type dopants from the first contact region have diffused. In some embodiments, the p-type dopants may be implanted at a location that does not overlap with p-type dopants diffused from a first contact region. For example, the p-type dopants diffused from the first contact region may diffuse laterally by 0.9 microns, and the p-type dopants may be implanted 0.9 microns from the first contact region, not overlapping the point to which the p-type dopants from the first contact region have diffused. In some embodiments, multiple masking and implantation steps may be employed while implanting p-type dopants. It should be appreciated that step 208 may be performed before steps 202, 204, and/or 206, and/or after steps 202, 204, and/or 206, in accordance with various embodiments.

At step 210, n-type dopants are implanted into a core region of the waveguide. In some embodiments, step 210 may be performed in the manner illustrated in and described in connection with FIG. 1E, in which the n-type dopants 108 are implanted into the second portion 126b of the core region 128. For example, in some embodiments, n-type dopants may be implanted in an entire second portion of a core region. In some embodiments, p-type dopants may be implanted in part of the second portion of the core region to offset some of the implanted n-type dopants. In some embodiments, n-type dopants may be implanted in only a part of a second portion of a core region. In some embodiments, n-type dopants may be additionally implanted in a portion of a waveguide disposed adjacent to a second portion of a core region. In some embodiments, the n-type dopants may be implanted at a location overlapping the location of n-type dopants diffused from a second contact region. For example, the n-type dopants diffused from the second contact region may diffuse laterally by 0.9 microns, and the n-type dopants may be implanted 0.8 microns from the second contact region, meaning that the implanted n-type dopants are located at a position to which the n-type dopants from the contact region have diffused. In some embodiments, the n-type dopants may be implanted at a location that does not overlap with n-type dopants diffused from a second contact region. For example, the n-type dopants diffused from the second contact region may diffuse laterally by 0.9 microns, and the n-type dopants may be implanted 0.9 microns from the second contact region, not overlapping the point to which the n-type dopants from the second contact region have diffused. In some embodiments, multiple masking and implantation steps may be employed while implanting n-type dopants.

It should be appreciated that step 210 may be performed before steps 202, 204, 206, and/or 208, and/or after steps 202, 204, 206, and/or 208, in accordance with various embodiments. In some embodiments, after step 210, the method 200 may further include annealing the waveguide 120 for a period of time shorter than in step 206. In some embodiments, the method 200 includes annealing the waveguide 120 for 5 seconds at 1030 degrees Celsius.

At step 212, electrodes are formed at the contact regions. In some embodiments, step 212 may be performed in the manner illustrated in and described in connection with FIG. 1G, in which the first and second electrodes 150a and 150b are disposed over the respective first and second contact regions 122a and 122b.

Figure 3:
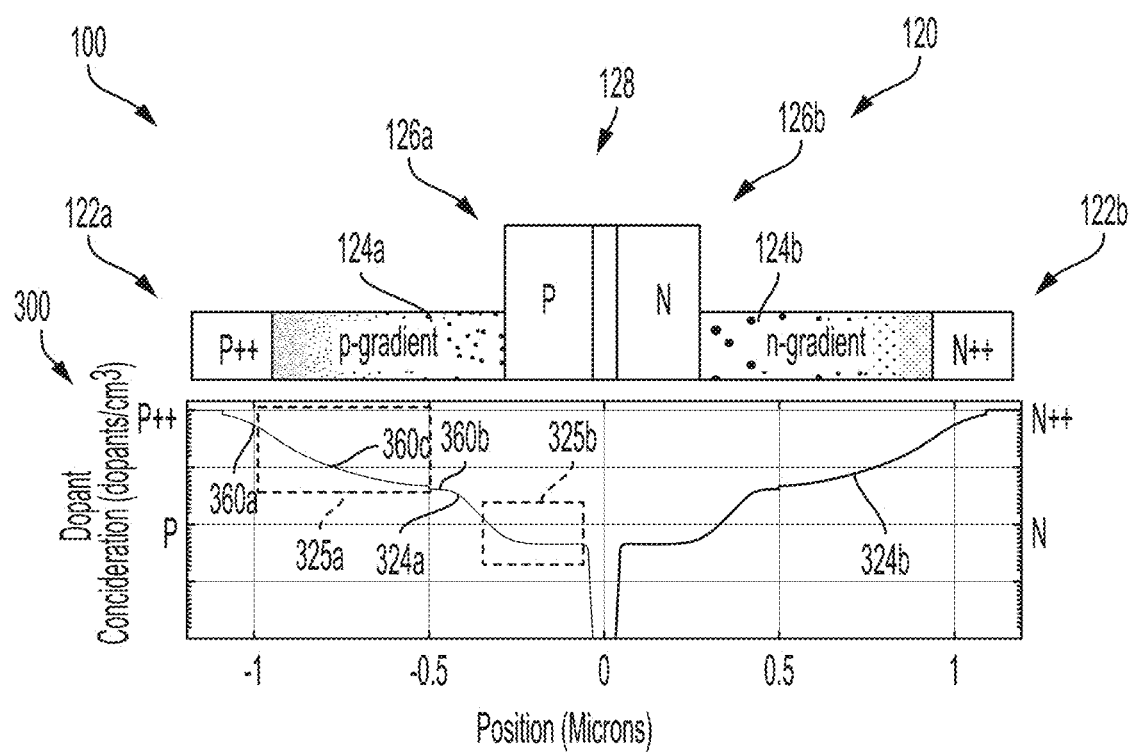
FIG. 3 is a graph of dopant concentration versus position within the waveguide of FIG. 1F, according to a non-limiting embodiment of the present application.

FIG. 3 is a graph 300 of dopant concentration versus position within the waveguide 120 as shown in FIG. 1F, according to a non-limiting embodiment of the present application. First and second curves 324a and 324b representing the first and second doping profiles 124a and 124b of the waveguide 120 are shown in the graph 300. In some embodiments, the first and second curves 324a and 324b may be smooth curves. As shown in FIG. 3, the first and second curves 324a and 324b are super-linear. Portion 325a of the first curve 324a, for example, decreases exponentially from the first contact region 122a to the core region 128. As opposed to including many step-wise reduced, laterally spaced implants to the slab region in an effort to approximate a smooth curve, aspects of the present application provide techniques for forming waveguides having dopant concentrations that follow a gradient, such as a smooth curve, in the lateral direction from the contact regions to the core region. Dopant concentrations that follow a smooth curve from the contact regions to the core region provide beneficial electrical resistance and low overlap between an optical signal supported by the waveguide and the dopants implanted in the waveguide. In some embodiments, annealing the waveguide 120 diffuses the p-type dopants 102 and the n-type dopants 104 into the core region 128, such that the first curve 324a and the second curve 324b continue to decrease within the core region 128. Also shown in FIG. 3, portion 325b of the first curve 324b decreases exponentially within the first portion 126a of the core region 128

As shown in FIG. 3, the first curve 324a, representing the dopant concentration according to the first doping profile 124a, decreases continuously from the first contact region 122a to the first portion 126a of the core region 128. In some embodiments, a portion of the first curve 324a decreases by at least 5% per 0.05 microns in the lateral direction from the first contact region 122a to the first portion 126a of the core region 128. As shown in FIG. 3, the portion 325a of the first curve 324a decreases by 9.3% per 0.05 microns in the lateral direction from a first point 360a positioned 1 micron from the center of the waveguide to a second point 360b positioned 0.5 microns from the center of the waveguide. In some embodiments, a portion of the first curve 324a decreases by at least 10% per 0.05 microns in the lateral direction. As shown in FIG. 3, the portion 325a of the first curve 324a decreases by 16.8% per 0.05 microns in the lateral direction from the first point 360a to a third point 360c positioned 0.75 microns from the center of the waveguide. The second curve 324b, representing the dopant concentration according to the second doping profile 124b, decreases continuously from the second contact region 122b to the second portion 126b of the core region 128. In some embodiments, a portion of the second curve 324b decreases by at least 5% per 0.05 microns in a direction opposite the lateral direction from the second contact region 122b to the second portion 126b of the core region 128. In some embodiments, a portion of the second curve 324b decreases by at least 10% per 0.05 microns in the direction opposite the lateral direction.

Figure 4:
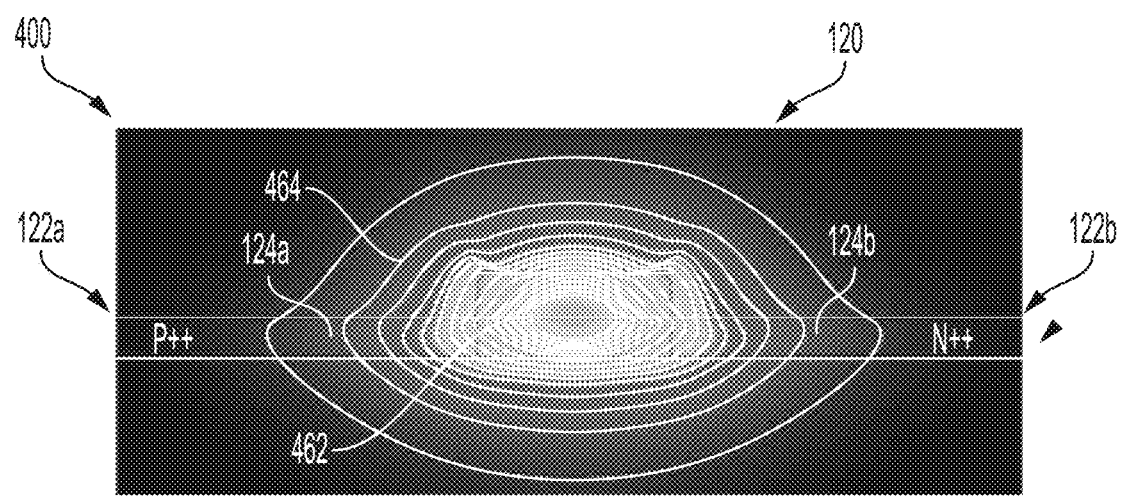
FIG. 4 is a graph of optical signal power versus position within the waveguide of FIG. 1F, according to a non-limiting embodiment of the present application.

FIG. 4 is a graph 400 of optical signal power versus position within the waveguide 120, according to a non-limiting embodiment of the present application. In FIG. 4, the optical signal power is concentrated on the core region 128, with fringes of the optical signal power positioned in portions of the waveguide 120 adjacent the core region 128, and with substantially none of the optical signal power positioned adjacent the first and second contact regions 122a and 122b. In FIG. 4, a first curve 462 positioned entirely within the core region 128 of the waveguide has a high optical signal power level, and a second curve 464 positioned between the core region 128 and the first contact region 122a has a low optical signal power. In some embodiments, the first and second doping profiles 124a and 124b may account for the pattern of the optical signal power in the waveguide 120. In some embodiments, the pattern of the optical signal power in the waveguide 120 may decrease super-linearly or exponentially from the core region 128 toward the respective first and second contact regions 122a and 122b. In some embodiments, the dopant concentration of the waveguide 120 may decrease super-linearly or exponentially from the first and second contact regions 122a and 122b toward the core region 128. In some embodiments, the optical signal power may be positioned in portions of the waveguide 120 having low dopant concentration, resulting in low overlap between the dopants in the waveguide 120 and the optical signal power, while having beneficial electrical resistance characteristics. In FIG. 4, the first curve 462 has a high optical signal power level and is positioned in the core region 128, which has a low doping concentration. The second curve 464 has a low optical signal power level and is positioned between the first portion 126a of the core region 128 and the first contact region 122a, where the doping concentration is higher than in the core region 128. The optical signal power in the waveguide 120 exponentially decreases from the first curve 462 toward the second curve 464, and the decreasing doping concentration in the waveguide 120 from the first contact region 122a toward the core region 128 accounts for the decrease in optical signal power for the first curve 462 toward the second curve 464.

FIGS. 5A-5I are cross-sectional views of a waveguide 520 of an electro-optical modulator 500 illustrating various steps for forming the waveguide 520, according to a non-limiting embodiment of the present application. The fabrication sequence of FIGS. 5A-5I differs from the fabrication sequence of FIGS. 1A-1G in the addition of the steps shown in FIGS. 5C-5D, described further below.

Figure 5A:
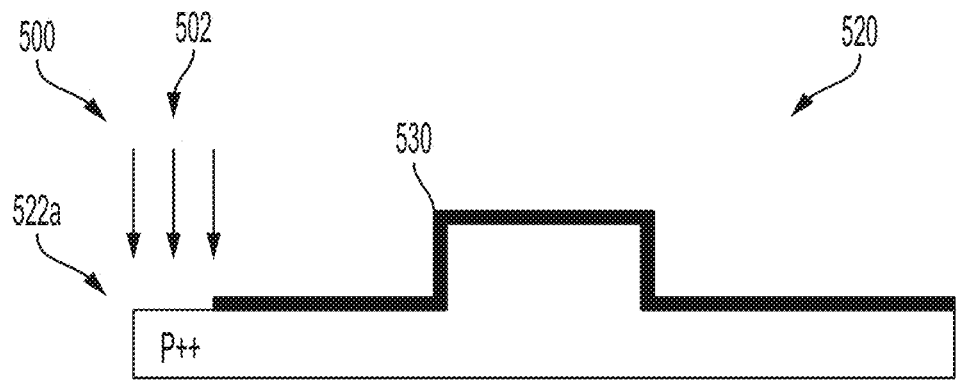
FIG. 5A is a cross-sectional view of a waveguide having p-type dopants implanted into a first contact region, according to a non-limiting embodiment of the present application.

FIG. 5A is a cross-sectional view of a waveguide 520 having p-type dopants 502 implanted into a first contact region 522a, according to a non-limiting embodiment of the present application. The p-type dopants 502 may be implanted into the first contact region 522a in the manner described for the waveguide 120 in connection with FIG. 1A.

Figure 5B:
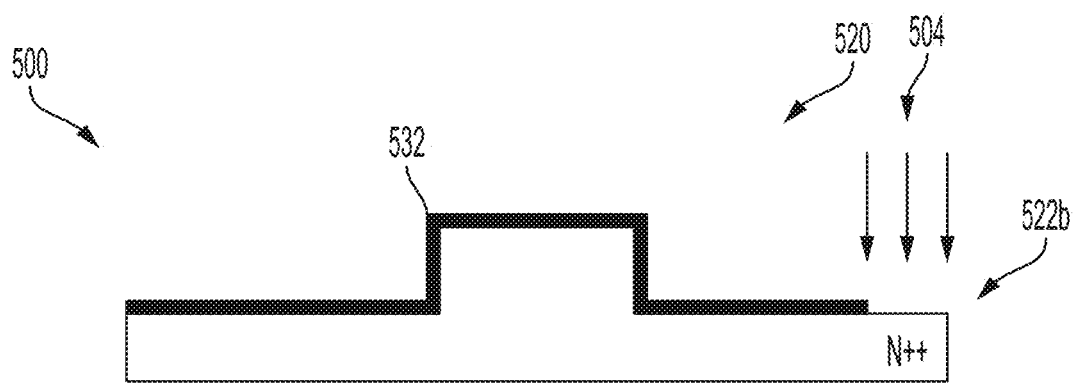
FIG. 5B is a cross-sectional view of the waveguide of FIG. 5A having n-type dopants implanted into a second contact region, according to a non-limiting embodiment of the present application.

FIG. 5B is a cross-sectional view of the waveguide 520 having n-type dopants 504 implanted into a second contact region 522b, according to a non-limiting embodiment of the present application. The n-type dopants 504 may be implanted into the second contact region 522b as described for the waveguide 120 in connection with FIG. 1B.

Figure 5C:
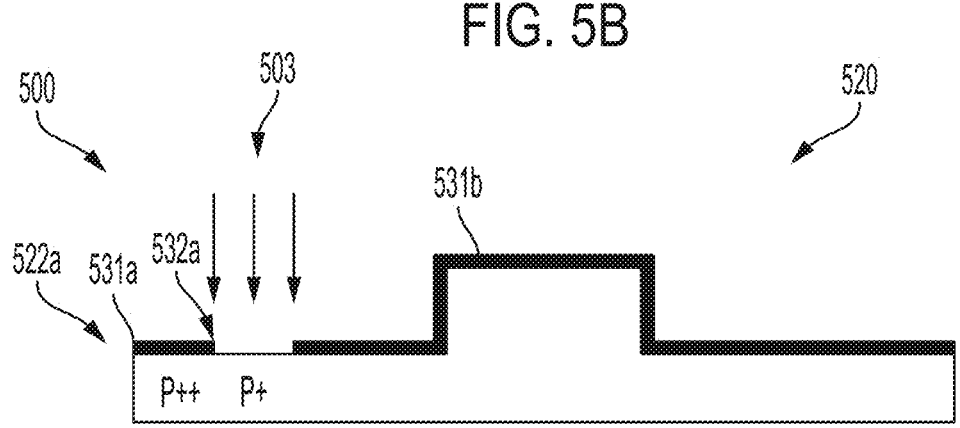
FIG. 5C is a cross-sectional view of the waveguide of FIGS. 5A-5B having p-type dopants implanted into the waveguide proximate the first contact portion, according to a non-limiting embodiment of the present application.

FIG. 5C is a cross-sectional view of the waveguide 520 having p-type dopants 503 implanted into the waveguide 520 proximate the first contact portion 522a, according to a non-limiting embodiment of the present application. As shown in FIG. 5C, the p-type dopants 503 are implanted into a portion 523a of the waveguide 520 positioned adjacent the first contact region 522a. In some embodiments, the portion 523a of the waveguide 520 may be implanted with a doping level that is lower than the doping level of the first contact region 522a. In some embodiments, the portion 523a may be implanted with a P+ doping level. In some embodiments, the portion 523a may have on the order of $10^{19}$ dopants/cm$^3$, although other concentrations are possible. As shown in FIG. 5C, a mask having mask portions 531a and 531b is disposed over the waveguide 520 to prevent the p-type dopants 503 from being implanted in regions other than the portion 523a.

Figure 5D:
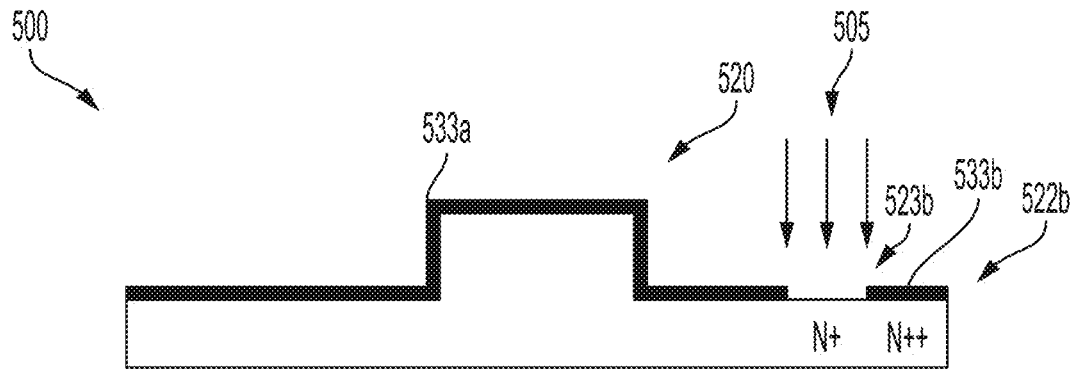
FIG. 5D is a cross-sectional view of the waveguide of FIGS. 5A-5C having n-type dopants implanted into the waveguide proximate the second contact portion, according to a non-limiting embodiment of the present application.

FIG. 5D is a cross-sectional view of the waveguide 520 having n-type dopants 505 implanted into the waveguide 520 proximate the second contact portion 522b, according to a non-limiting embodiment of the present application. As shown in FIG. 5D, the n-type dopants 505 are implanted into a portion 523b of the waveguide 520 positioned adjacent the second contact region 522b. In some embodiments, the portion 523b of the waveguide 520 may be implanted with a doping level that is lower than the doping level of the second contact region 522b. In some embodiments, the portion 523b may be implanted with an N+ doping level. In some embodiments, the portion 523b may have on the order of $10^{19}$ dopants/cm$^3$, although other concentrations are possible. As shown in FIG. 5D, a mask having mask portions 533a and 533b is disposed over the waveguide 520 to prevent the n-type dopants 505 from being implanted in regions other than the portion 523b.

Figure 5E:
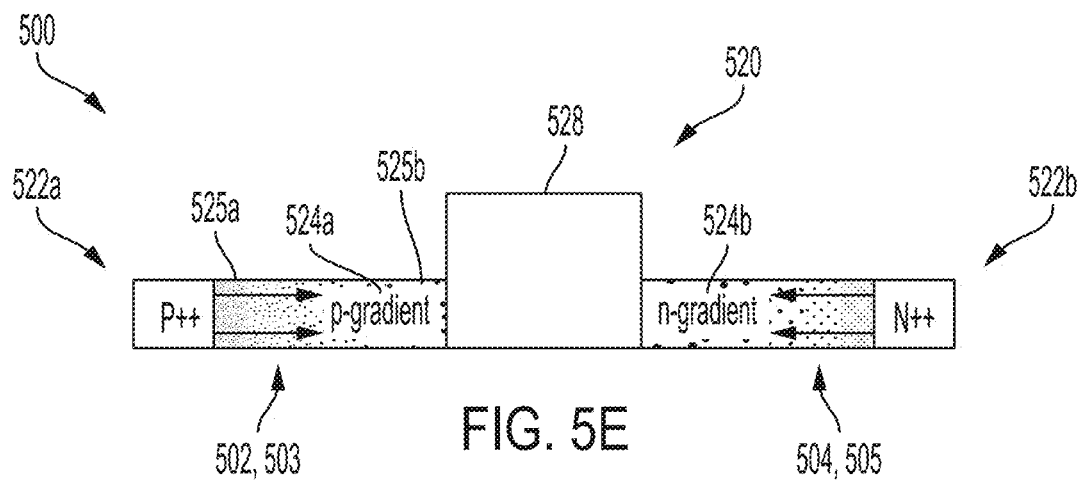
FIG. 5E is a cross-sectional view of the waveguide of FIGS. 5A-5D as the p-type dopants and the n-type dopants are diffused laterally from the respective first and second contact regions toward a core region of the waveguide, according to a non-limiting embodiment of the present application.

FIG. 5E is a cross-sectional view of the waveguide 520 as the p-type dopants and the n-type dopants are diffused laterally from the respective first and second contact regions 522a and 522b toward a core region 528 of the waveguide 520, according to a non-limiting embodiment of the present application. The p-type dopants 502 and 503 and the n-type dopants 504 and 505 may be diffused in the manner described for the p-type dopants 102 and the n-type dopants 104 implanted into waveguide 120 in connection with FIG. 1C.

Figure 5F:
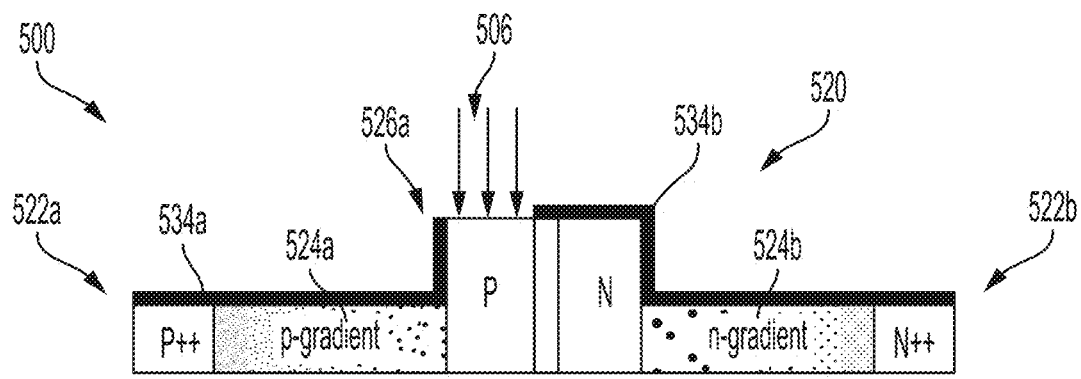
FIG. 5F is a cross-sectional view of the waveguide of FIGS. 5A-5E having p-type dopants implanted into a first portion of the core region, according to a non-limiting embodiment of the present application.

FIG. 5F is a cross-sectional view of the waveguide 520 having p-type dopants 506 implanted into a first portion 526a of the core region 528, according to a non-limiting embodiment of the present application. The p-type dopants 506 may be implanted into the first portion 526a of the core region 528 in the manner described for waveguide 120 in connection with FIG. 1D.

Figure 5G:
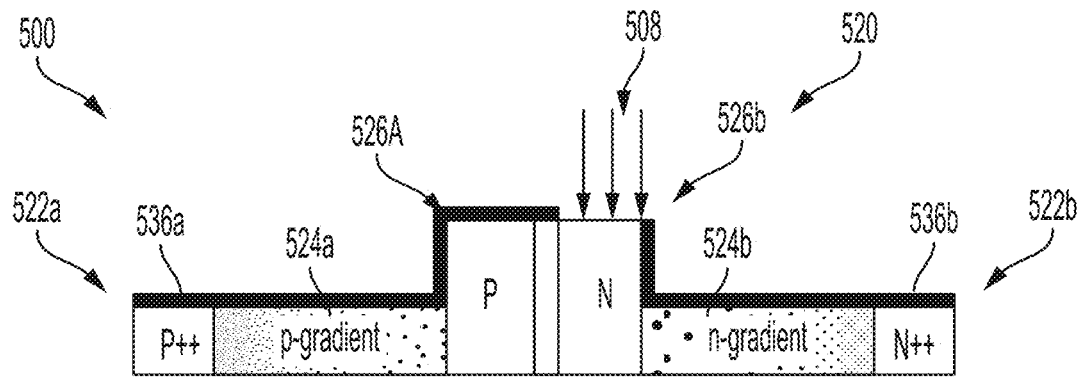
FIG. 5G is a cross-sectional view of the waveguide of FIGS. 5A-5F having n-type dopants implanted into a second portion of the core region, according to a non-limiting embodiment of the present application.

FIG. 5G is a cross-sectional view of the waveguide 520 having n-type dopants 508 implanted into a second portion 526b of the core region 528, according to a non-limiting embodiment of the present application. The n-type dopants 508 may be implanted into the second portion 526b of the core region 528 in the manner described for waveguide 120 in connection with FIG. 1E.

Figure 5H:
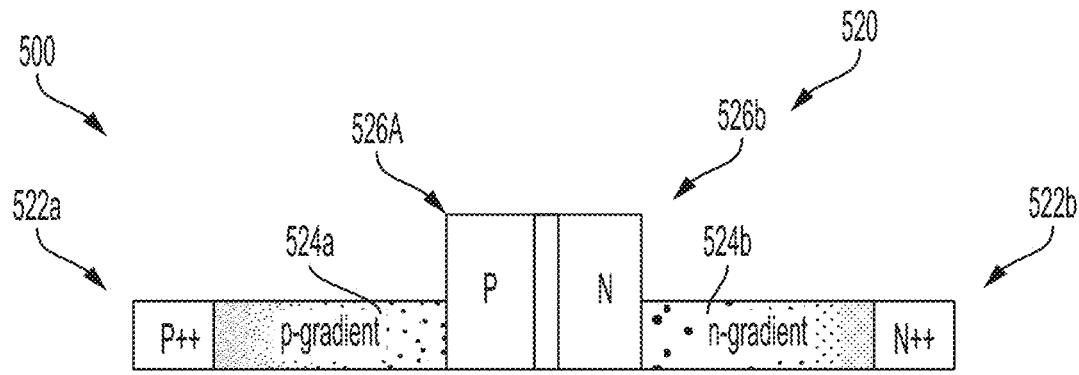
FIG. 5H is a cross-sectional view of the waveguide of FIGS. 5A-5G with a first doping profile connecting the first contact region to the first portion of the core region and a second doping profile connecting the second contact region to the second portion of the core region, according to a non-limiting embodiment of the present application.

FIG. 5H is a cross-sectional view of the waveguide 520 with a first doping profile 524a connecting the first contact region 522a to the first portion 526a of the core region 528 and a second doping profile 524b connecting the second contact region 522b to the second portion 526b of the core region 528, according to a non-limiting embodiment of the present application. The first and second doping profiles 524a and 524b may be configured in the manner described for the first and second doping profiles 124 and 124b in connection with FIG. 1F.

Figure 5I:
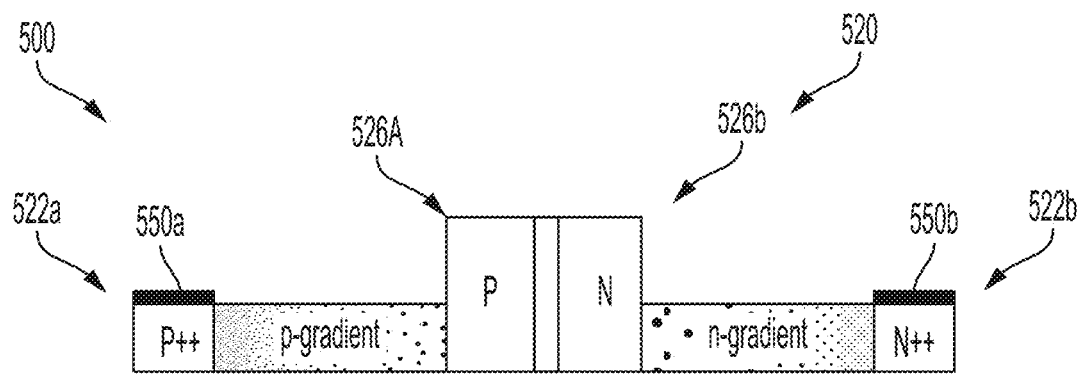
FIG. 5I is a cross-sectional view of the waveguide of FIGS. 5A-5H further including a first electrode disposed over the first contact region and a second electrode disposed over the second contact region, according to a non-limiting embodiment of the present application.

FIG. 5I is a cross-sectional view of the waveguide 520 further including a first electrode 550a disposed over the first contact region 522a and a second electrode 550b disposed over the second contact region 522b, according to a non-limiting embodiment of the present application. The first and second electrodes 550a and 550b may be configured in the manner described for the first and second electrodes 150a and 150b in connection with FIG. 1G.

Figure 6:
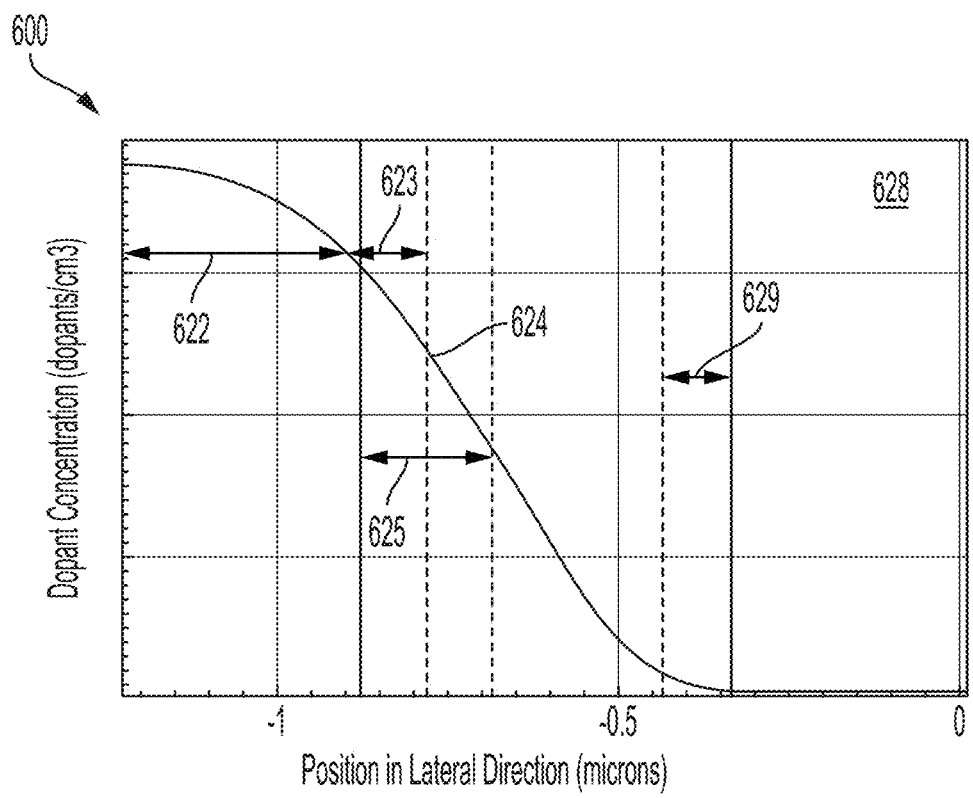
FIG. 6 is a graph of dopant concentration versus position within a waveguide, according to a non-limiting embodiment of the present application.

FIG. 6 is a graph 600 of dopant concentration versus position within a portion of a waveguide, according to a non-limiting embodiment of the present application. As shown in FIG. 6, the graph 600 includes a curve 624 corresponding to the dopant concentration within the portion of the waveguide. In some embodiments, the portion may include a contact region and a core region of the waveguide, such as the first contact region 122a or 522a and the first portion 126a or 526a of the core region 128 or 528 of the waveguide 120 or 520. For example, in the graph 600, the contact region may be positioned in region 622 and the core region may be positioned in region 628. In some embodiments, the curve 624 may be in accordance with the doping profiles 124a, 124b, 524a, and/or 524b. First, second, and third regions 623a, 623b, and 623c are identified in the graph 600.

As shown in FIG. 6, the curve 624, representing the dopant concentration in the portion of the waveguide, decreases continuously from the first contact region 122a to the first portion 126a of the core region 128. In some embodiments, a portion of the first curve 324a decreases by at least 5% per 0.05 microns in the lateral direction from the first contact region 122a to the first portion 126a of the core region 128. As shown in FIG. 6, the curve 624 decreases by 9.8% per 0.05 microns in the lateral direction in the first region 623a. In some embodiments, a portion of the first curve 324a decreases by at least 10% per 0.05 microns in the lateral direction from the first contact region 122a to the first portion 126a of the core region 128. As shown in FIG. 6, the curve 624 decreases by 10.6% per 0.05 microns in the lateral direction in the third region 623c.

In some embodiments, the curve 624 may be a superlinear or exponential curve. In some embodiments, the curve 624 have a different rate of change in dopant concentration versus position at different points within the waveguide. The rate of change in dopant concentration versus position at a given point within the waveguide may be determined from the derivative of the curve 624 at the given point, which may be approximated by determining the slope of a line connecting two points on the curve 624 equidistant from the given point in the lateral direction and positioned on opposite sides of the given point in the lateral direction. The accuracy of the approximation increases as the distance between the given point and the two equidistant points decreases. As shown in FIG. 6, the first region 623a is located entirely within 0.1 microns of the contact region 622 and the second region 623b is located entirely within 0.1 microns of the core region 128. As shown in FIG. 6, the dopant concentration decreases at any point within the first region 623a at least at a first rate of change, as the dopant concentration may have a different rate of change at various points within the first region 623a, and the dopant concentration decreases at any point within the second region 623b at least at a second rate of change, as the dopant concentration may have a different rate of change at various points within the second region 623b. As shown in FIG. 6, the various rates of change at which the dopant concentration decreases within the first region 623a, including the first rate of change, is at least three times the various rates of change at which the dopant concentration decreases within the second region 623b, including the second rate of change. For example, in FIG. 6, the dopant concentration decreases within the first region 623a at least at a rate of $10^{20}$ dopants/cm$^3$ per micron in the lateral direction, and the dopant concentration decreases within the second region 623b at least at a rate of $2\times10^{19}$ dopants/cm$^3$ per micron in the lateral direction.

In FIG. 6, the third region 623c is located entirely within 0.3 microns of the contact region 622, with the dopant concentration decreasing within the third region 623c at least at a third rate of change, as the dopant concentration may have a different rate of change at various points within the third region 623c. The various rates of change at which the dopant concentration decreases within the third region 623c, including the third rate of change, is at least three times the various rates at which the dopant concentration decreases within the second region 623*b*, including the second rate of change. For example, in FIG. 6, the dopant concentration decreases within the third region 623*c* at least at a rate of $10^{20}$ dopants/cm$^3$ per micron in the lateral direction.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A method of forming an electro-optical modulator, the method comprising:
   defining a waveguide having a core region;
   masking the waveguide;
   implanting dopants into a contact region of the waveguide;
   diffusing the dopants laterally toward the core region; and
   creating a doping profile from the contact region to the core region,
   wherein the doping profile is a super-linear curve having two separate portions, each portion exponentially decreasing in a lateral direction towards the core region,
   the doping profile configured to have a first optical power level in one portion of the two separate portions and a second optical power level in the other portion of the two separate portions,
   wherein the doping profile is configured to reduce overlap between a portion of the waveguide that carries an optical signal and increase an electrical conductivity of the waveguide by increasing a concentration of the dopants in the waveguide.

2. The method of claim 1, wherein diffusing the dopants laterally toward the core region comprises annealing the waveguide.

3. The method of claim 1, wherein diffusing the dopants laterally toward the core region causes the creating the doping profile from the contact region to the core region.

4. The method of claim 3, wherein the super-linear curve drops by at least 5% per 0.05 microns in the lateral direction within the waveguide.

5. The method of claim 3, wherein the super-linear curve comprises creating the doping profile that drops by at least 10% per 0.05 microns in the lateral direction within the waveguide.

6. The method of claim 1, wherein each portion of the super-linear curve is a separate exponential curve.

7. The method of claim 1, wherein diffusing the dopants laterally toward the core region comprises creating the doping profile comprising:
   at least a first rate of change of a dopant concentration at any point within a first region of the waveguide,
   wherein the first region of the waveguide is located entirely within 0.3 microns of the contact region in the lateral direction within the waveguide;
   at least a second rate of change of the dopant concentration at any point within a second region of the waveguide,
   wherein the second region of the waveguide is located entirely within 0.1 microns of the core region in the lateral direction,
   wherein the at least the first rate of change of the dopant concentration is at least three times greater than the at least the second rate of change of the dopant concentration,
   wherein the first region includes one of the two separate portions, and the second region includes the other of the two separate portions,
   wherein the doping profile is configured to reduce overlap between a portion of the waveguide that carries an optical signal and increase the electrical conductivity of the waveguide by increasing the concentration of the dopants in the waveguide.

8. The method of claim 1 further comprising:
   implanting a second plurality of dopants into a second contact region of the waveguide;
   diffusing the second plurality of dopants laterally toward the core region; and
   creating a second doping profile from the second contact region to the core region, wherein the second doping profile is a super-linear curve having two separate portions, each portion exponentially decreasing in a lateral direction towards the core region from the second contact region.

9. A method of forming a doped optical waveguide, the method comprising:
   implanting n-type and p-type dopants into respective first and second contact regions of the doped optical waveguide;
   annealing the doped optical waveguide to induce lateral diffusion of the n-type and p-type dopants toward a center of the dopoed optical waveguide, wherein annealing the doped optical waveguide causes creating a first doping profile from the first contact region to the center and a second doping profile from the second contact region to the center; and
   creating the first doping profile from the first contact region to the center, and the second doping profile from the second contact region to the center, wherein each doping profile is a super-linear curve having two separate portions, wherein each portion exponentially decreases in a lateral direction towards the center, wherein each portion of the super-linear curve of each doping profile includes a separate exponential curve.

10. The method of claim 9, wherein the super-linear curve of the first doping profile from the first contact region to the center drops by at least 5% per 0.05 microns in the lateral direction within the doped optical waveguide.

11. The method of claim 9, wherein the super-linear curve of the first doping profile from the first contact region to the center drops by at least 10% per 0.05 microns in the lateral direction within the doped optical waveguide.

12. An electro-optical modulator, comprising:
   a waveguide comprising a contact region and a core region,
   wherein the waveguide has a dopant concentration that decreases from the contact region to the core region according to a super-linear curve having two separate portions, wherein each portion exponentially decreases in a lateral direction towards the core region,
   wherein each portion of the super-linear curve is a separate exponential curve, wherein the waveguide has a doping profile,
   wherein the doping profile is configured to reduce overlap between a portion of the waveguide that carries an optical signal and increase electrical conductivity of the waveguide by increasing concentration of dopants in the waveguide,
   wherein the waveguide comprises:
   a first doping region between the contact region and the core region having an n-type dopant concentration that decreases from the contact region to the core region according to a first super-linear curve; and a second doping region between a second contact region and the core region having a p-type dopant concentration that decreases from the second contact region to the core region according to a second super-linear curve, the first super-linear curve comprises two separate portions, each portion exponentially decreasing in the lateral direction towards the core region, the second super-linear curve comprises two separate portions, each portion exponentially decreasing in the lateral direction towards the core region.

13. The electro-optical modulator of claim 12, wherein the dopant concentration decreases by at least 5% per 0.05 microns in the lateral direction within the waveguide.

14. The electro-optical modulator of claim 12, wherein the dopant concentration decreases by at least 10% per 0.05 microns in the lateral direction within the waveguide.

15. The electro-optical modulator of claim 12, wherein the waveguide further comprises:

a first region located entirely within 0.1 microns of the contact region in the lateral direction within the waveguide; and a second region located entirely within 0.1 microns of the core region in the lateral direction, wherein the dopant concentration decreases at any point within the first region at least at a first rate of change that is at least three times greater than at least a second rate of change at which the dopant concentration decreases at any point within the second region, wherein the first region includes one of the two separate portions, and the second region includes the other of the two separate portions.

16. The electro-optical modulator of claim 12, wherein the waveguide further comprises:

a first region located entirely within 0.3 microns of the contact region in the lateral direction within the waveguide; and a second region located entirely within 0.1 microns of the core region in the lateral direction, wherein the dopant concentration decreases at any point within the first region at least at a first rate of change that is at least three times greater than at least a second rate of change at which the dopant concentration decreases at any point within the second region, wherein the first region includes one of the two separate portions, and the second region includes the other of the two separate portions.

17. An electro-optical modulator comprising:

a rib waveguide comprising a core region, a first contact region and a second contact region;

the core region including a first portion, a second portion, and a depletion region that separates the first and second portion, wherein the depletion region substantially lacks charge carrier; and wherein the rib waveguide has a dopant concentration that includes p-type dopants that decrease from the first contact region to the core region according to a super-linear curve and n-type dopants that decrease from the second contact region to the core region according to a super-linear curve;

wherein each super-linear curve has two separate portions, wherein each portion of the super-linear curve is a separate exponential curve that exponentially decreases in a lateral direction towards the core region such that there is low overlap between an optical signal and the n-type and p-type dopants in the rib waveguide, wherein n-type dopants concentrations follow a gradient from the second contact region to the core region, wherein p-type dopant concentrations follow a gradient from the first contact region to the core region.

* * * * *